United States Patent [19]
Wright

[11] 3,903,024
[45] *Sept. 2, 1975

[54] PHOTODEGRADABLE STYRENE POLYMER FOAMS

[75] Inventor: Harold A. Wright, Murrysville, Pa.

[73] Assignee: ARCO Polymers, Inc., Philadelphia, Pa.

[ * ] Notice: The portion of the term of this patent subsequent to Aug. 27, 1991, has been disclaimed.

[22] Filed: Oct. 19, 1973

[21] Appl. No.: 408,084

[52] U.S. Cl. ........ 260/2.5 HB; 260/2.5 B; 260/30.2; 260/30.4 R; 260/DIG. 43
[51] Int. Cl.² .......................................... C08G 69/16
[58] Field of Search..... 260/DIG. 43, 2.5 HB, 2.5 B, 260/30.2, 30.4 R

[56] References Cited
UNITED STATES PATENTS

| | | | |
|---|---|---|---|
| 2,983,692 | 5/1961 | D'Alelio | 260/2.5 |
| 3,679,777 | 7/1972 | Lambert | 260/897 |
| 3,797,690 | 3/1974 | Taylor et al. | 220/1 |
| 3,798,187 | 3/1974 | Miyoshi et al. | 260/2.5 |
| 3,832,312 | 8/1974 | Wright | 260/2.5 HB |

OTHER PUBLICATIONS

"Polymer Preprints," Vol. 13, No. 2, Aug. 1972, p. 627.

Primary Examiner—Eugene C. Rzucidlo
Attorney, Agent, or Firm—Lewis J. Young

[57] ABSTRACT

Expandable styrene polymer particles which are photodegradable are produced by suspending styrene polymer particles in an aqueous medium and impregnating a blowing agent into the particles in the presence of 0.5–5.0 parts of photosensitizer per 100 parts of polymer particles. The photosensitizer is selected from xanthene and thioxanthene and their alkyl derivatives.

1 Claim, No Drawings

PHOTODEGRADABLE STYRENE POLYMER FOAMS

BACKGROUND OF THE INVENTION

This invention relates to a process for making foamed styrene polymers photodegradable by incorporating photosensitizers into the polymer during the impregnation of the polymers with a blowing agent.

The making of low density, cellular, shaped, plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to fill the mold and fuse together to form a shaped article. Examples of articles made by this process are drinking cups, meat packaging trays, egg cartons, fruit packaging trays and the like.

The articles so produced are generally quite stable to sunlight and weather conditions. It is desirable, however, to provide a method whereby discarded foamed articles will degrade under outdoor weather conditions to help disposal problems and prevent litter accumulation.

Many additives have been developed which accelerate the degradation of plastic articles and much experimentation is being done to develop new systems. The additives are generally added to the polymers by physical mixing, such as bleeding, or by simultaneous extrusion of the polymer and additive. One such additive is benzophenone, a compound known to be a photosensitizer.

SUMMARY OF THE INVENTION

In accordance with the present invention, photosensitizers selected from xanthene and thioxanthene and their alkyl derivatives are incorporated into styrene polymer particles during the process of impregnating the particles with a blowing agent. Incorporation of from 0.5 to 5.0 parts of photosensitizer per 100 parts of polymer gives a foamable product which, when foamed, is degradable by sunlight and weather much more rapidly than is the untreated polymer.

DETAILED DESCRIPTION OF THE INVENTION

In accordance with this invention, a variety of expandable thermoplastic homopolymers can be rendered degradable. The polymers may be derived from vinyl aromatic monomers including styrene, vinyltoluene, isopropylstyrene, alpha-methylstyrene, nuclear methylstyrene, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50 percent by weight of the copolymer. For the purpose of convenience, these polymers and copolymers are referred to herein as styrene polymers.

The styrene polymers can, of course, be produced by any of the known techniques. The preferred method of preparation is the suspension technique, which gives bead or pellet shaped product.

The photosensitizer may be added to the polymer particles after the particles have been completely polymerized (i.e., as a hard bead impregnation). Addition of photosensitizer prior to substantially complete polymerization can result in upsetting the delicate balance needed for the polymerization reaction and would result in interference with the reaction. The addition, in this instance, is to the aqueous suspension in which the particles were prepared and prior to separation of the particles from the aqueous reaction medium. The blowing agent can be added either prior to hard bead formation or simultaneously with the photosensitizer.

Alternatively, particles of styrene polymer may be resuspended in an aqueous medium and impregnated with blowing agent and photosensitizer. In this case, suspending agents are added to the water to keep the particles from agglomerating at the elevated temperatures used during the impregnation process. Suitable suspending agent systems are, for example, those described in D'Alelio U.S. Pat. No. 2,983,692, such as tricalcium phosphate in combination with an anionic surfactant.

The impregnation is conventionally carried out at temperatures ranging from about 80° to 150°C. Increasing the temperature makes the impregnation proceed at a faster rate.

The blowing agents are compounds which are gases or which will produce gases on heating. Preferred blowing agents include aliphatic hydrocarbons containing from 4–7 carbon atoms in the molecule, such as butane, pentane, hexane, heptane, cyclohexane, and the halogenated hydrocarbons which boil at a temperature below the softening point of the polymer. Mixtures of these agents may also be used, such as a mixture of 40–60 percent n-pentane and 60–40 percent trichlorofluoromethane. Usually from 3 to 20 percent of blowing agent per 100 parts of polymer is incorporated by the impregnation.

The photosensitizers useful in the present invention are xanthene and thioxanthene and their alkyl derivatives. The alkyl derivatives must be those compounds substituted in the aromatic rings, i.e., in the 1,2,3,4,5,6,7, or 8 positions. The alkyl should be those containing 1 to 4 carbon atoms such as methyl, ethyl, propyl or butyl. Alkyl substitutions in the heterocyclic ring, i.e., in the 9-position, would probably destroy the photosensitivity of the molecules.

The photosensitizer is added to the suspension of polymer particles at the same time as the blowing agent. Best results are obtained when amounts of photosensitizer between 0.5 and 5.0 parts per 100 parts of polymer are added. Less than 0.5 part of photosensitizer does not give sufficiently accelerated rates of degradation, while greater than 5.0 parts of photosensitizer may tend to plasticize the polymer particles and cause difficulty in the molding process.

The invention is further illustrated by the following examples wherein parts are parts by weight unless otherwise indicated.

EXAMPLE 1

To a reactor, there was charged in sequence 100 parts of water, 0.025 part of sodium dodecylbenzenesulfonate, 1.0 part of xanthene, 2.0 parts of tricalcium phosphate, 100 parts of polystyrene beads having a particle size of predominantly through 16 and on 35 mesh, U. S. Standard Sieve, and 9.0 parts of n-pentane. The mixture was stirred and heated during 1 hour to 90°C. to form a suspension. The suspension was maintained at 90°C. for 3 hours and then the temperature was raised during 0.5 hour to 115°C. and maintained at that temperature for an additional 6 hours. The suspension was cooled to room temperature and acidified to a pH of 1.4 with HCl. The beads were separated from the aqueous phase by centrifuge, washed with water, and air dried at room temperature. A control experiment was run using the above procedure omitting the xanthene.

The beads from the above impregnation process were pre-expanded to a density of about 1.26 pounds per cubic foot (p.c.f.). The pre-expanded beads were then molded into strips of foam 1 inch × 5 inch × ½ inch of approximately 1.5 p.c.f. density.

These strips were masked with aluminum foil, wrapped around the long axis, such that about half the strip was protected. The strips were then placed flat beneath a 20-watt fluorescent sunlamp such that the exposed half of the strips were about 3 inches from the light. After one 96-hour lamp exposure, the strip containing the xanthene showed gross yellowing and embrittlement compared to the control strip.

Similar preparation and treatment of samples containing 0.5, 2.0 and 2.5 parts of xanthene per 100 parts of polystyrene showed that the degradation due to ultraviolet light was greater with greater amounts of the sensitizer. Beads containing 5.0 parts of xanthene were easily prepared by the process of the invention, but were somewhat difficult to mold into acceptable foam strips due to excessive plasticizing action of the sensitizer on the polystyrene.

EXAMPLE II

The procedure of Example I was repeated using 1.0 part of thioxanthene as sensitizer. Foamed strips were exposed under the 20-watt fluorescent sunlamp as in Example I with the result that, after one 96-hour exposure, the strip containing thioxanthene showed gross yellowing and embrittlement compared to the control strip.

What is claimed is:

1. A process for making expandable styrene polymer particles containing a photosensitizer comprising suspending styrene polymer particles with the aid of a suspending system in water containing a blowing agent and a photosensitizer, heating the suspension at a temperature from about 80° to 150°C. to impregnate the polymer particles, and separating the impregnated particles from the water; said photosensitizer being present in an amount of 0.5–5.0 parts per 100 parts of said polymer particles and being selected from the group consisting of xanthene, thioxanthene, and their $C_1$-$C_4$ alkyl derivatives; said alkyl substituents being in any except the 9-position.

* * * * *